United States Patent [19]

Curtis et al.

[11] 4,044,078
[45] Aug. 23, 1977

[54] AIR HANDLER

[75] Inventors: Richard E. Curtis, Pleasanton; Robert H. Dench, Monte Sereno; Victor J. Dervin, Cupertino, all of Calif.

[73] Assignee: N.P.I. Corporation, Burlingame, Calif.

[21] Appl. No.: 656,121

[22] Filed: Feb. 9, 1976

[51] Int. Cl.² .............................................. B01F 3/04
[52] U.S. Cl. ..................................... 261/30; 261/113; 261/151
[58] Field of Search ........... 261/113, 97, 30, DIG. 14, 261/151, 114 R, 110–112, DIG. 11; 55/525

[56] References Cited

U.S. PATENT DOCUMENTS

| | | | |
|---|---|---|---|
| 1,176,747 | 3/1916 | Ferguson | 261/113 X |
| 2,568,749 | 9/1951 | Kittel | 261/113 |
| 2,678,199 | 5/1954 | Koch | 261/113 X |
| 2,752,138 | 6/1956 | Kittel | 261/113 |
| 3,272,484 | 9/1966 | Brand et al. | 261/113 X |
| 3,318,586 | 5/1967 | Meredith | 261/30 |
| 3,338,566 | 8/1967 | Kittel | 261/113 |
| 3,367,638 | 2/1968 | Leva | 261/113 |
| 3,878,594 | 8/1975 | Minor, Jr. | 55/525 X |
| 3,892,825 | 7/1975 | Nazzer | 261/114 R |
| 3,928,513 | 12/1975 | Leva | 261/113 |

OTHER PUBLICATIONS

Petroleum Processing, "Spiral Flow for Better Distillation," Apr., 1953, pp. 556–559.

Primary Examiner—Tim R. Miles
Assistant Examiner—Richard L. Chiesa
Attorney, Agent, or Firm—Lothrop & West

[57] ABSTRACT

An air handler especially for use with a produce storage room has a housing with an air inlet near the bottom and an air outlet near the top. A fan or blower supplies air above atmospheric pressure to the inlet for flow through the housing and discharge from the top thereof and through a duct leading to the storage room. Adjacent the housing there is a water cooler, usually operated in a refrigerator circuit, into which water is introduced from a collector near the bottom of the housing and from which the cooled water is discharged into a distributor in the housing near the top thereof. The distributor, preferably a number of sprays, discharges the cooled water to fall over and through a water and air baffle unit within the housing between the inlet and the outlet thereof and into the collector. The water and air baffle unit has a plurality of expanded metal plates, conveniently of aluminum, extending substantially horizontally across the interior of the housing between the distributor and the collector, with the metal plates vertically separated and supported to provide intervening, cross spaces for air and water flow.

1 Claim, 3 Drawing Figures

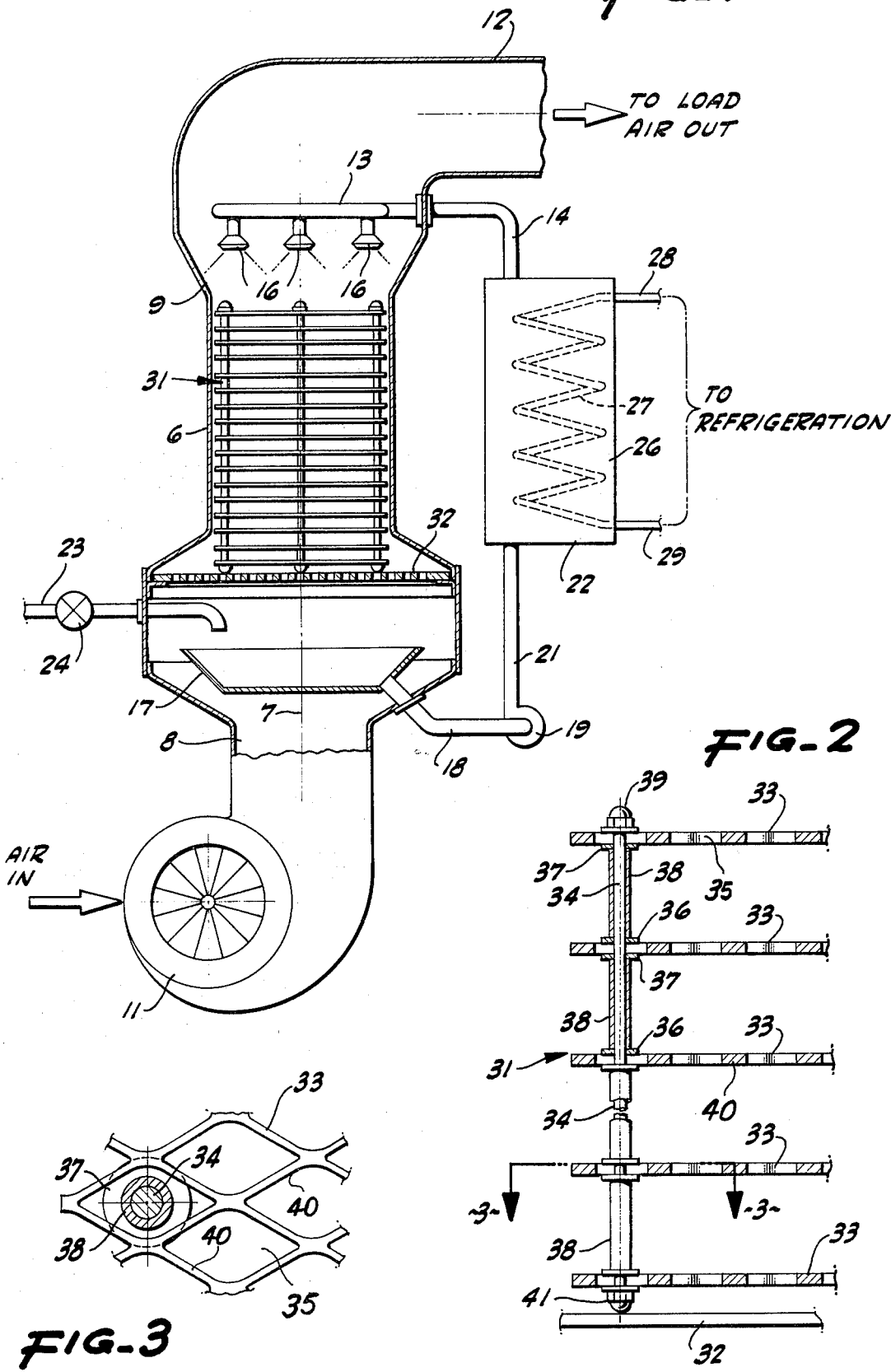

AIR HANDLER

In the handling of produce containing field heat, it is desirable initially to reduce the amount of the field heat. This is precooling and may alone be sufficient for many purposes. Often, the produce is precooled to a holding temperature and is then kept in a holding room for a protracted period. It is advantageous to utilize atmospheric air cooled, properly humidified and discharged into the storage room so that replaced air released from the storage room carries off excess heat and so that the produce is maintained for long periods in a satisfactory condition.

A large number of devices for this general purpose have been developed and utilized. Many of them are not sufficiently economical or otherwise advantageous to warrant extensive practical use. One form of device for this purpose is shown in U.S. Pat. No. 3,318,586 issued May 9, 1967 to D. Meredith. While such an apparatus has many advantages, it is nevertheless an object of the present invention to improve thereover and to improve over all previous devices so as to provide a device which is compact, has a long life and is subject to substantially no operational difficulties.

Another object of the invention is to provide an air handler that affords a way of homogeneously and rapidly interrelating air and cooling water and to provide a satisfactorily cooled discharge air stream for a storage room.

Another object of the invention is to provide an arrangement of this sort having relatively few movable parts, most parts being of a relatively standard and well-known nature.

A further object of the invention is to provide an air handler in which the mechanism has some heat storage capacity of its own in order to serve as a heat reservoir to damp out temperature fluctuations.

A further object of the invention is to provide an air handler in which the mechanism can be set up at the beginning of a season, can operate uninterruptedly throughout the season, and will not require service or substantial attention until the season is over.

Another object of the invention is in general to provide an improved air handler.

Other objects, together with the foregoing, are attained in the embodiment of the invention described in the accompanying description and illustrated in the accompanying drawings, in which:

FIG. 1 is a schematic or diagrammatic showing of an air handler constructed pursuant to the invention;

FIG. 2 is an enlarged detail showing a portion of the construction of the water and air baffle unit; and FIG. 3 is a cross-section to an enlarged scale, the plane of section being on the line 3—3 of FIG. 2.

While the air handler of the invention has many applications and can be utilized in various instances other than in fruit handling, it has practical success been operated in connection with the storage or holding of grapes. In such an environment there is preferably provided an appropriately supported housing 6. This is conveniently a metal enclosure of a selected cross-section, either circular or rectangular, and is arranged generally with its axis 7 disposed vertically. The housing has an airlet 8 near the bottom and has an air outlet 9 near the top. Atmospheric air at ambient temperature is supplied to the inlet 8 through a standard blower 11 or fan suitably driven and effective to force atmospheric air at something above atmospheric pressure upwardly in an axial direction, through the inlet 8 and through the housing 6 and finally through the outlet 9. A duct 12 connects the outlet to the storage room or "load," not shown, and from which there is any suitable sort of exhaust air release to the atmosphere.

Disposed within and appropriately supported in the housing 6 near the upper end thereof and adjacent the outlet 9 is a water distributor 13. This conveniently takes the form of a water carrying pipe 14 or manifold, appropriately supported, and discharging through a plurality or array of nozzles 16 or the like to release water at a high point and with a relatively even distribution with respect to the cross-sectional area of the housing 6. The released water falls with its release velocity and by gravity and is received in a collector 17 near the housing inlet 8. From the collector 17 water is led off through a conduit 18 into a force pump 19 of a standard form and driven by a motor. From the pump 19 the water is discharged through a pipe 21 into a heat exchanger 22. The water leaves the exchanger via the pipe 14 for discharge and recirculation.

A charge of plain water or sometimes water with an additive to depress its freezing point or another suitable heat carrying medium is circulated over and over throughout a season. If the water becomes depleted at any time, make-up water is added through an auxiliary inlet pipe 23 having a control valve 24 therein. Between the inlet 18 and the outlet 14 the circulating water is preferably cooled by refrigeration. To that end the pipe 21 leads into a water cooler including a casing 26 in which is installed a cooling coil 27 having ducts 28 and 29 extending to a refrigeration surce, not shown. The effect of flow through the casing 26 is to cool the water so that there is discharged from the distributor 13 a shower of relatively cold water, usually at a temperature just above 32° Fahrenheit.

Particularly pursuant to the invention there is disposed in the housing 6 and between the inlet 8 and the outlet 9 thereof a water and air baffle unit 31. This unit is substantially as shown in detail in FIG. 2 and is a body resting on a transverse grid base 32 affording a support for the baffle unit at a convenient height within the housing. The unit itself is made up of a plurality of generally flat plates 33, each of which is preferably comprised of an expanded metal sheet such as expanded aluminum affording approximately diamond shape openings 35 between bars 40 rectangular in cross-section. The plates have a shape in plan closely corresponding to the cross-sectional shape of the housing 6. The expanded plates 33 are each carried on a plurality of upright rods 34 by means of washers 36 and 37 disposed on the rods and lying on opposite sides of the respective plates, the rods passing through the openings 35. The plates 33 are spaced apart vertically a selected amount by means of spacing tubes 38 threaded over the rods 34 and disposed between adjacent washers resting on the bars 40. The entire unit is held together under compression by jam nuts 39 at the top and acorn nuts 41 at the bottom, the latter serving as supports for the unit and allowing lateral expansion and contraction thereof.

With this arrangement the relatively cold distributed by and showering from the nozzle outlets 16 falls under its initial pressure and by gravity onto and over the reticulations or bar-like members in the expanded metal sheets 33 and so is broken up, finely divided and formed into thin films. The water drops, mist and spray likewise coat all of the surfaces available, to provide a thin film of water throughout the exposed interior surfaces of the housing 6 and of the expanded plate 33, the latter affording greatly extended areas. The water eventually falls into the collector 17, forming a body therein available for prompt recirculation and recooling.

At the same time, air under slightly higher than atmospheric pressure flows upwardly around the collector 17 and is distributed generally across the area of the housing 6 by means of the expansion bars of the expanded sheets 33. The sheets act as diverters and baffles as well as orifices and rudimentary nozzles, forming eddies, back flows, small jets and vortices. The flowing air and falling water traveling counterflow become thoroughly intimate. The relative humidity of the air consequently adjusts itself very close to 100 percent. Since the water temperature is cooled to a value below the ambient temperature of the air taken in by the blower 11, the air temperature is correspondingly reduced and approaches or approximates the temperature of the water, being close to 32° Fahrenheit as it discharges through the duct 12.

The baffle unit 31, being comprised of a number of metallic members, serves along with the adjoining metal of the housing 6 as a heat storing or reservoir member. The temperature of the metal portions of the unit, once reaching equilibrium, tends to stay very close to that equilibrium over a protracted period despite some variation in instantaneous ambient air temperature. Because the individual plates 33 or grids are spaced apart vertically or axially, there is adequate space between successive plates for the air to take on vortices and eddy flows, not being channelled or ducted, but becoming intimately admixed with the falling water. There is space for local, transverse flows (with components normal to the axis 7) so that throughout the unit, not only from the bottom to the top but likewise from side to side, there is an intimate and generally homogeneous contact and interface of water droplets or spray droplets and water film, with resulting compact or intimate heat transfer and humidification.

Since the only moving parts of the structure are in the blower 11 and the pump 19, and since both of these may be relatively standard, well-known units, the mechanism is able to operate for a whole season or other protracted period with little or no mechanical attention. Even after prolonged operation, the unit 31 remains relatively clean and uncontaminated, since any dust or debris imported through the blower 11 is washed out by the falling spray and is caught in and usually deposits in the collector 17. Such material usually is heavier than water and simply collects as a layer on the bottom of the collector. It can be removed at any time by back flushing or preferably can await cleaning at the season's end.

If at any time there should be a desire to change the unit 31, it is simple to remove the housing 6 from its connections, to lift the unit 31 off of the support 32 and to replace the unit with a different one, either different in plate number of spacings or different in expanded metal pattern and dimensions.

What is claimed is:

1. An air handler especially for use with a produce storage room comprising a housing having an upright tubular portion, a transversely enlarged lower portion immediately below said tubular portion, a reduced vertical inlet portion opening into the bottom of said enlarged lower portion, an enlarged vertical outlet portion opening from the top of said tubular portion, means for supplying air above atmospheric pressure to said inlet portion, means for conducting air from said outlet portion to said storage room, a water cooler, a water collector positioned substantially centrally in said enlarged lower portion spaced above and extending entirely across said inlet portion and spaced below and extending entirely across said tubular portion, said collector being of less transverse dimension than said enlarged portion to provide an air flow path therearound from said inlet portion to said tubular portion, a water distributor in said outlet portion, means for withdrawing water from said collector and propelling said water through said water cooler to said distributor to fall from said distributor through said tubular portion back to said collector, a transverse grid base extending across said enlarged lower portion above said collector, and a water and air baffle unit in said tubular portion in the path of water falling from said distributor to said collector, said unit including a plurality of superposed expanded metal flat plates having diamond-shaped openings between connecting bars therein and each extending horizontally substantially across said housing, said unit also including vertical rods at their lower ends resting loosely on said transverse grid base for transverse movement and supporting individual ones of said plates at vertical intervals from adjacent ones of said plates to provide intervening spaces between said plates for air and water flow.

* * * * *